(12) United States Patent
Okuda et al.

(10) Patent No.: US 7,140,260 B2
(45) Date of Patent: Nov. 28, 2006

(54) GAS FLOW MEASURING DEVICE AND GAS FLOW MEASURING METHOD

(75) Inventors: Hiroshi Okuda, Hyogo (JP); Akiko Kuse, Hyogo (JP)

(73) Assignee: Espec Corp., Osaka (JP)

( * ) Notice: Subject to any disclaimer, the term of this patent is extended or adjusted under 35 U.S.C. 154(b) by 0 days.

(21) Appl. No.: 10/967,214

(22) Filed: Oct. 19, 2004

(65) Prior Publication Data

US 2005/0092099 A1 May 5, 2005

(30) Foreign Application Priority Data

Oct. 31, 2003 (JP) ............................. 2003-373110

(51) Int. Cl.
*G01N 3/08* (2006.01)

(52) U.S. Cl. ............................................ 73/826

(58) Field of Classification Search ............. 73/861.04; 62/195, 50.1, 149; 438/258, 241; 118/715; 117/954, 98, 101, 102, 103, 104; 203/3; 261/130

See application file for complete search history.

(56) References Cited

U.S. PATENT DOCUMENTS 4,980,204 A * 12/1990 Fujii et al. ................. 117/98
6,237,348 B1 * 5/2001 Ide et al. .................... 62/50.1
6,593,189 B1 * 7/2003 Kanda ........................ 438/258
6,705,100 B1 * 3/2004 Wolfgram et al. ............ 62/195

FOREIGN PATENT DOCUMENTS

JP 2646788 B2 5/1997

* cited by examiner

*Primary Examiner*—Jewel Thompson
(74) *Attorney, Agent, or Firm*—Harness, Dickey & Pierce, P.L.C.

(57) ABSTRACT

The present invention realizes (i) a gas flow measuring device which can measure a gas flow of a low-boiling gas in a mixed gas including two types of gasses having different boiling points, and (ii) a method of measuring a gas flow easily but highly precisely, using the gas flow measuring device. The gas flow measuring device includes a condensing tank for condensing a mixed gas in which two types of gasses having different boiling points are mixed with each other, and a flow meter for measuring the flow of the mixed gas. After condensing the mixed gas in the condensing tank so as to cause the gas flow of the high-boiling gas to be known, the flow is measured using the flow meter so that the gas flow of the low-boiling gas is worked out.

14 Claims, 10 Drawing Sheets

GAS FLOW MEASURING DEVICE AND GAS FLOW MEASURING METHOD

This Nonprofitional application claims priority under 35 U.S.C. §119(a) on Patent Application No. 2003/373110 filed in Japan on Oct. 31, 2003, the entire contents of which are hereby incorporated by reference.

FIELD OF THE INVENTION

The present invention relates to a gas flow measuring device and a gas flow measuring method, and particularly to a gas flow measuring device and a gas flow measuring method for measuring a gas flow of a low-boiling gas in a mixed gas including two types of gasses having different boiling points.

BACKGROUND OF THE INVENTION

A typical example of conventional gas flow measuring devices is a vapor flow measuring device which measures a vapor flow in a high dew point process gas system such as a fuel cell power generation system (see e.g. Japanese Patent No. 2646788 (registered on May 9, 1997) which will be hereinafter referred to as Document 1). A vapor flow measuring device disclosed by Document 1 can precisely measure a vapor flow using a measuring instrument (dew point recorder) which measures a vapor flow (dew point). The vapor flow measuring device disclosed by Document 1 lowers the dew point to be measured, by mixing a known amount of inactive gas into a target gas including vapor, and reducing the partial pressure of the vapor.

In other words, the vapor flow measuring device of Document 1 dilutes a target gas including vapor with a predetermined flow of inactive gas so as to measure the dew point being lowered. This prevents such a problem that, in a high dew point region, a subtle measurement error of the dew point results in a considerable difference of the partial pressure of the vapor. Subsequently, the vapor flow measuring device of Document 1 measures the partial pressure of the vapor from the measured dew point and the pressure at the point of measuring the dew point, so as to measure the vapor flow with reference to the partial pressure of the vapor and the flow of the inactive gas.

However, the vapor flow measuring device of Document 1 is for measuring a vapor flow, thereby not being able to measure gas flows of respective gas components of a mixed gas.

In this regard, there has been no known device which can, by itself, measure gas flows of respective gas components of a mixed gas, and hence gas flows of respective gas components of a mixed gas have typically been measured in the following manner.

First, after measuring a flow of a mixed gas using, for instance, a volume flow meter which can measure any types of gasses, gas concentrations of respective components are measured using any one of a gas chromatography, a mass spectrometer and a spectrophotometer. From the results of these measurements, gas flows of respective gas components of a mixed gas are measured.

That is to say, even if the types of gas components of a mixed gas are known, the volume flow meter cannot measure gas flows of the respective components without being provided with a gas concentration ratio between the components, thereby requiring another analytical instrument such as a gas chromatography and a mass spectrometer. In this manner, since not only a flow of a mixed gas but also a concentration ratio have to be measured, the operation of measuring the flow is complicated and the accuracy of the measurement result is insufficient. Furthermore, the gas chromatography and the mass spectrometer are expensive, large in size, and require a skilled operator.

When an area flow meter or a hot-wire mass flow meter is adopted instead of the volume flow meter, even if the types of gas components of a mixed gas and a gas concentration ratio between the components are known, the gas flow of the respective components cannot be measured. This is because the area flow meter and the hot-wire mass flow meter have to convert the temperature change with gas flowing to a quantity of the flow, for respective components of a mixed gas.

SUMMARY OF THE INVENTION

The present invention is done to solve the above-identified problem, and thus the objective of. the present invention is to realize (i) a gas flow measuring device which can measure a gas flow of a low-boiling gas in a mixed gas including two types of gasses having different boiling points, and (ii) a method of measuring a gas flow easily but highly precisely, using the gas flow measuring device.

To achieve this objective, the gas flow measuring device of the present invention, which includes a flow meter for measuring a flow of a mixed gas including two types of gasses which are mixed with each other and have different boiling points, is characterized by comprising a condensing tank for condensing the mixed gas.

As described above, the gas flow measuring device of the present invention, which includes a flow meter for measuring a flow of a mixed gas including two types of gasses which are mixed with each other and have different boiling points, includes a condensing tank for condensing the mixed gas. Thus the gas flow of the low-boiling gas of the mixed gas is precisely worked out from the flow measured by the flow meter.

That is to say, the mixed gas is condensed in the condensing tank so that the dew point of the high-boiling gas of the mixed gas is figured out, and hence the concentration of the high-boiling gas is calculated. On this account, the gas flow of the low-boiling gas can be worked out from the flow measured by the flow meter, by measuring the flow of the condensed mixed gas and referring to, for instance, a correction value which has been calculated in advance. The correction value is calculated in such a manner that, the high-boiling gas is condensed at a predetermined temperature so as to be saturated at this temperature, and then a measurement error due to the presence of the high-boiling gas with the known concentration is measured. In this manner, with reference to the correction value, the gas flow of the low-boiling gas is precisely worked out without being influenced by the high-boiling gas, by measuring the flow of the mixed gas using the flow meter.

As the flow meter, various types of flow meters including a hot-wire flow meter can be adopted. Such flow meters quickly respond and carry out precise measurements, compared to conventional dew point meters, and thus the gas flow can be measured quickly and precisely with these flow meters.

To achieve the above-mentioned objective, the gas flow measuring method of the present invention is characterized by comprising the steps of: (i) mixing two types of gasses having different boiling points and thus producing a mixed gas; (ii) condensing the mixed gas; and (iii) measuring a flow of the mixed gas.

As described above, the gas flow measuring method of the present invention comprises the steps of: (i) mixing two types of gasses having different boiling points and thus producing a mixed gas; (ii) condensing the mixed gas; and (iii) measuring a flow of the mixed gas. With this method, it is possible to measure the gas flow of a low-boiling gas of a mixed gas in which two types of gasses having different boiling points are mixed with each other.

That is to say, even if the mixed gas is made up of two types of gasses which cannot be completely separated from each other, the gas flow of the high-boiling gas at a condensation temperature can be figured out by condensing the mixed gas. Thus, the gas flow of the low-boiling gas can be worked out by measuring the flow of the mixed gas. This brings about such an effect that the gas flow of the low-boiling gas can be measured only by measuring the mixed gas in which two types of gasses are mixed with each other, without using instruments such as a chromatography, which are expensive and require a skilled operator.

For a fuller understanding of the nature and advantages of the invention, reference should be made to the ensuing detailed description taken in conjunction with the accompanying drawings.

DESCRIPTION OF THE EMBODIMENTS

[First Embodiment]

Figure 1:
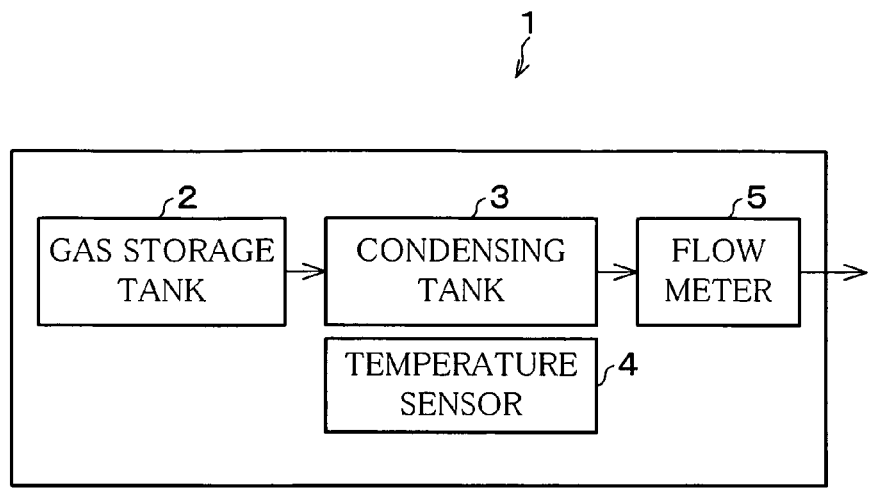
FIG. 1 relates to an embodiment of the present invention, and is a block diagram schematically showing a gas flow measuring device.
Figure 2:
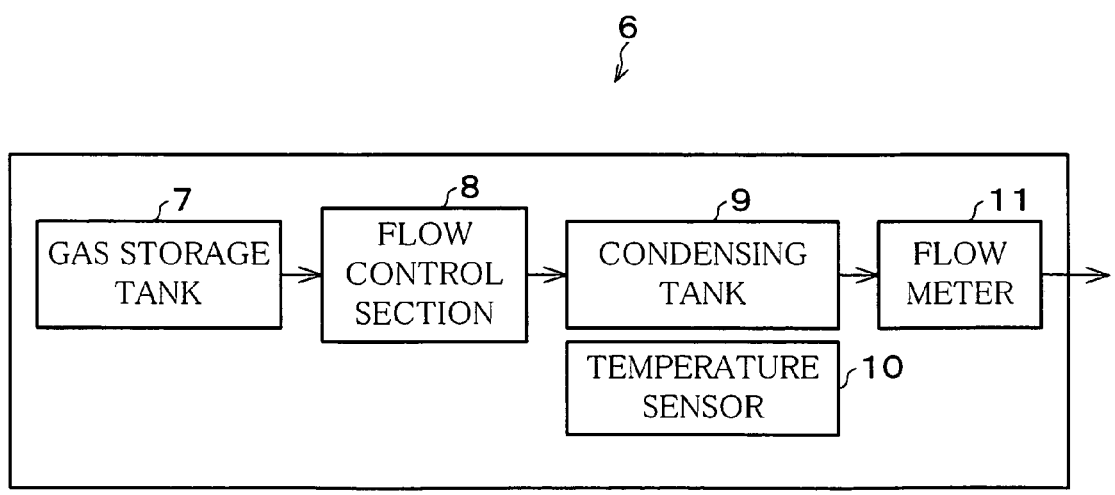
FIG. 2 also relates to the embodiment, and is a block diagram schematically showing a correcting gas flow measuring device which works out a correction value.

First Embodiment of the present invention will be described with reference to FIGS. 1 and 2. FIG. 1 is a block diagram schematically showing a gas flow measuring device 1 of the present invention. As FIG. 1 illustrates, the gas flow measuring device 1 includes a gas storage tank 2, a condensing tank 3, a temperature sensor 4, and a flow meter 5.

The gas storage tank 2 stores a gas therein, and discharges a predetermined amount of the gas as the need arises. The gas stored in the gas storage tank 2 is an object of flow measurement by the gas flow measuring device 1 of the present invention, and thus the gas will be hereinafter referred to as first component. Any types of devices can be adopted as the gas storage tank 2 on condition that a device can store and discharge a gas, and a cylinder is preferably used. Note that, the first component discharged from the gas storage tank 2 is mixed with a gas (hereinafter, second component) having a boiling point higher than that of the first component, and then supplied to the condensing tank 3.

The condensing tank 3 condenses the supplied mixed gas made up of the first and the second components. In the condensing tank 3, the mixed gas is condensed in such a manner as to cause the second component to be saturated. On this account, the condensation is carried out at temperatures and pressures at which the second component is saturated, but is preferably carried out at a temperature identical with the temperature of the first component being discharged from the gas storage tank 2. The mixed gas condensed in the condensing tank 3 is then supplied to the flow meter 5.

Note that, the condensing tank 3 may be a separation tank in which the mixed gas is condensed so that the second component is saturated, and consequently the liquefied second component separates from the first component. Although the first component and the second component are gasses which cannot be completely separated from each other, the separation tank makes it possible to reduce the flow of the second component, thereby reducing an error on the occasion of measuring the flow of the first component. The separation of the second component may be carried out through absorption instead of the condensation.

The temperature sensor 4 detects a temperature on the occasion of condensing the mixed gas in the condensing tank 3. Since the temperature of the condensing tank 3 is detected by the temperature sensor 4, the temperature control in the condensing tank 3 is realized and the condensation can be carried out at a desired temperature. There are no limitations on the choice of the temperature sensor 4 as long as the temperature of the condensing tank 3 is detected. Preferable examples of the temperature sensor 4 include a platinum resistance temperature sensor and a thermocouple. It is noted that, when the condensation in the condensing tank 3 is carried out at a pressure at which the second component is saturated, a pressure sensor for sensing a pressure on the occasion of condensing the mixed gas is adopted instead of the temperature sensor 4.

The flow meter 5 measures the flow of the mixed gas discharged from the condensing tank 3. There are no limitations on the choice of the flow meter 5 as long as the flow of the mixed gas discharged from the condensing tank 3 can be measured, but preferable examples of the flow meter 5 are a hot-wire flow meter, a volume flow meter, an area flow meter, a soap-film flow meter, a Coriolis flow meter, and a wet flow meter. The flow meter 5 is arranged to be suitable for measuring the flow of the first component; and hence in the present case the flow meter 5 can precisely measure the flow of the first component using, for instance, a below-mentioned correction value calculated by the measurement in advance.

Note that, the flow meter 5 is not necessarily arranged to be suitable for the first component, and thus, in view of the below-mentioned correction value, the flow meter 5 may be arranged to be suitable for measuring the mixed gas. In this case, the flow of the mixed gas is measured so that the flow measured by the flow meter 5 is equal to the flow of the first component.

The gas flow measuring device 1 of the present invention may further include a flow control section for controlling the flow of the first component discharged from the gas storage tank 2. In this case, the flow of the first component discharged from the gas storage tank 2 is under control so that a desired flow of the first component is always discharged. The flow control by the flow control section is preferably carried out in such a manner as to keep the flow of the first component to be constant.

The gas flow measuring device 1 may further include a mixing tank for mixing the first component with the second component. With this mixing tank, the first component and second component are uniformly mixed. The mixing tank may be a saturation tank which not only mixes the first and second components with each other but also causes the second component to be saturated at a certain temperature.

Next, a gas flow measuring method using the above-described gas flow measuring device 1 will be discussed. According to the gas flow measuring method of the present invention, in a fluid in which two types of components which cannot be completely separated from each other coexist, a flow of one component is precisely measured. That is to say, the gas flow measuring method is for measuring a gas flow of a low-boiling gas in a mixed gas including two types of gasses having different boiling points.

On this account, even if the flow of a mixed gas, which includes a first component which is the object of flow measurement and a second component which cannot be completely separated from the first component, is measured using a flow meter for the first component, the gas flow measuring method of the present invention makes it possible to precisely measure the flow of the first component, without being influenced by the second component. Furthermore, the flow is precisely measured by correcting, using a correction value worked out in advance, the flow measured by the flow meter.

The above-mentioned two-types of gasses having different boiling points are arranged as follows: These gasses are generated by evaporating two types of liquids having different boiling points, have significantly different dew points and freezing points, and do not produce an azeotrope when mixed with each other. The two-types of gasses are not necessarily a combination of two single-ingredient gasses such as a hydrogen gas and an oxygen gas. The following are examples of the combination of the gasses: a combination of gasses each including more than one component but having characteristics similar to single-ingredient gasses, such as azeotropes, and a combination of a single-ingredient gas and a gas having characteristics similar to single-ingredient gasses. In short, any combinations of gasses which are practically assumed as two types of single-ingredient gasses are acceptable.

Examples of the combination of gasses used in the present invention are: hydrogen/vapor; hydrogen/azeotrope of water and alcohol; hydrazine/air; methanol/air; oxygen/mixture of nitrogen and vapor; and oxygen/mixture of nitrogen and ethanol.

The correction value is used for correcting the flow of the mixed gas measured by the gas flow measuring device 1. With this correction value, the flow of the first component of the mixed gas, which cannot be completely separated, is precisely measured. The correction value is worked out in such a manner that the second component is condensed at a predetermined temperature to be a known concentration of saturated gas, and a measurement error due to the presence of this known concentration of the second component is measured.

Now, a method of working out the correction value is described. The flow of the mixed gas in which the first and second components coexist is measured using the correcting gas flow measuring device 6 shown in FIG. 2, and from the result of this measurement, the correction value is worked out. More specifically, as shown in FIG. 2, the flow of the first component discharged from the gas storage tank 7 is controlled by the flow control section 8 so as to be constant. Subsequently, the first component is mixed with the second component having a boiling point higher than that of the first component, and then the mixed gas is supplied to the condensing tank 9. In the condensing tank 9, the mixed gas is condensed at a predetermined temperature using the temperature sensor 10, so that the second component is saturated. In this state, the flow of the mixed gas being condensed is measured using the flow meter 11. The flow of the second component in this case is known as the second component is in the state of a saturated gas at the predetermined temperature. For this reason, the flow of the first component can be worked out. Then from the flow controlled by the flow control section 8 and the flow of the first component measured by the flow meter 11, a measurement error due to the presence of the second component is measured. Consequently, the correction value is worked out from this measurement error.

The correction value is, as a flow deviation, worked out from the results of flow measurements with varied parameters. The correction value being worked out can be represented as a correction table, correction formula, or correction graph. The flow deviation is calculated by subtracting the flow of the first component measured by the flow meter 11 from the constant flow controlled by the flow control section 8. Examples of the above-mentioned parameters include an initial flow of the first component, pressure in the system (flow path), condensation temperature, and a type of the first component. The flow is measured with these parameters being varied, so that flow deviations, i.e. correction values in various conditions are worked out.

Now, a method of measuring the flow of the first component using the gas flow measuring device 1 of the present invention will be described with reference to FIG. 1. First, the first component is discharged from the gas storage tank 2 and then mixed with the second component (mixing step), and the mixed gas is supplied to the condensing tank 3. In the condensing tank 3, the mixed gas is then condensed (condensing step). The condensation is carried out at a predetermined temperature in such a manner as to cause the second component to be saturated. The predetermined temperature is within a range of temperatures at which the second component is saturated, and preferably is identical with the temperature at which the first component is discharged from the gas storage tank 2. This is because the objective of the method is to measure the flow of this first component. The condensation is carried out using the temperature sensor 4. This temperature sensor 4 realizes the temperature control.

Moreover, the condensation may be carried out at a predetermined pressure instead of at the predetermined temperature. In this case, the second component is condensed at a pressure at which the second component is caused to be saturated, and a pressure sensor is preferably adopted in place of the temperature sensor.

The mixed gas condensed at the predetermined temperature in the condensing tank 3 is discharged to the flow meter 5, with the second component being a saturated gas at the predetermined temperature. The flow meter 5 then measures the flow of the mixed gas (flow measuring step), and the mixed gas is discharged from the flow meter 5. Even though the flow meter 5 is arranged for measuring the first component, the second component is saturated so that the concentration thereof is known, and for this reason the flow of the first component can be measured by measuring the flow of the mixed gas. However, when the second component is mixed with the first component, the flow of the first component cannot be precisely measured. On this account, it is preferable that the flow is corrected using the correction value (correcting step). This correction using the correction value makes it possible to work out a more precise flow of the first component. More specifically, the correction value which has been worked out in advance is added to the flow of the mixed gas worked out by the gas flow measuring device 1 of the present invention, so that the flow of the first component is worked out more precisely. An appropriate correction value corresponding to the conditions of the gas flow measuring device 1 is obtained from the correction table, correction formula, or correction graph which has been worked out in advance.

It is noted that, since the temperature at which the mixed gas is condensed is known as above, the flow of the second component is also known. For this reason, when the measuring conditions (initial flow of the first component, pressure in the system, condensation temperature, etc.) of the gas flow measuring device 1 are known and constant, the flow meter 5 is arranged in advance to be suitable for the mixed gas made up of the first and second components, and the flow of the first component is precisely worked out with reference to the values indicated by the above-described conditions. In other words, after measuring the flow, it is unnecessary to carry out the correction using the correction value, and hence a value indicated by the flow meter 5 precisely shows the flow of the first component.

In this manner, a gas flow of a low-boiling gas in a mixed gas including two types of gasses which have different boiling points and cannot be completely separated from each other is precisely measured with ease, without using devices such as a dew point meter, a gas chromatography, and a mass spectrometer.

[Embodiment 2]

Embodiment 2 of the present invention will be discussed with reference to FIG. 3. Note that, as described above, the gas flow measuring method of the present invention is arranged such that the mixed gas is condensed in the condensing tank so that the second component is caused to have a known concentration, and this makes it possible to work out the flow of the first component by measuring the flow of the mixed gas. Thus, even in a system in which the concentration of the first component varies after the first component is discharged form the gas storage tank and before the first component flows into the condensing tank, the flow of the first component can be precisely measured. The following will describe the gas flow measuring method of the present invention, taking, as an example, the gas flow measuring device in which the concentration of the first component varies.

Figure 3:
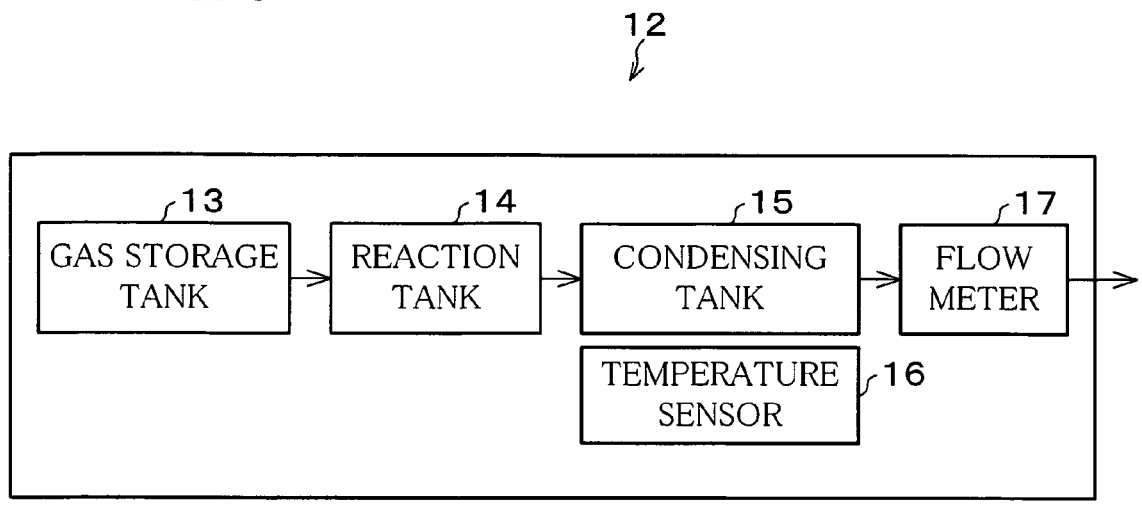
FIG. 3 relates to another embodiment of the present invention, and is a block diagram schematically showing a gas flow measuring device.

FIG. 3 is a block diagram schematically showing a gas flow measuring device 12 in which the concentration of a first component varies. As shown in the figure, the gas flow measuring device 12 includes a gas storage tank 13, a reaction tank 14, a condensing tank 15, a temperature sensor 16, and a flow meter 17. Among these members, the gas storage tank 13, the condensing tank 15, the temperature sensor 16, and the flow meter 17 are identical with the gas storage tank 2, the condensing tank 3, the temperature sensor 4, and the flow meter 5 of Embodiment 1, respectively. In other words, the gas flow measuring device 12 of the present embodiment is identical with the gas flow measuring device 1 of Embodiment 1, except that the reaction tank 14 is additionally provided. For this reason, the descriptions of the members discussed in Embodiment 1 are not given for the sake of convenience. Gasses (first and second components) of the present embodiment are also identical with the gasses in Embodiment 1.

To the reaction tank 14, the mixed gas made up of the first and second components flows in, and the first component of the mixed gas flowed in is subjected to a reaction. After being subjected to a predetermined reaction in the reaction tank 14, the mixed gas is discharged from the reaction tank 14 and then supplied to the condensing tank 15. For this reason, the concentration of the first component flowing into the reaction tank 14 is different from the concentration of the first component discharged therefrom. Note that, the reaction tank 14 is not limited to a system in which the first component is subjected to a reaction, and hence, as the reaction tank 14, it is possible to adopt any types of systems in which the mixed gas flowed therein is subjected to a certain operation and the concentration of the first component which is the low-boiling gas is varied. Examples of such reaction tank 14 are a fuel cell, oil refinery device, and distilling device.

The gas flow measuring device 12 may further include members such as a flow control section and mixing tank. When the flow control section is included, the flow of the first component discharged from the gas storage tank 13 is controlled by the flow control section. On this account, the flow of the first component being discharged is always kept at a desired amount. Meanwhile, when the mixing tank is provided, the first and second component are uniformly mixed. When the mixing tank is a saturation tank, it is possible to cause the second component to be saturated at a predetermined temperature as well as mix the first and second components.

Now, a gas flow measuring method using the above-mentioned gas flow measuring device 12 is discussed. First, the correction value is worked out in the same manner as in Embodiment 1. Then the first component is discharged from the gas storage tank 13 of the gas flow measuring device 12, and the first and second components are mixed with each other. Subsequently, the mixed gas is supplied to the reaction tank 14. On this occasion, if the flow control section is provided, the flow of the first component is controlled to be constant by the flow control section. Meanwhile, if the mixing tank is provided, the first and second components are uniformly mixed with each other in the mixing tank and then supplied to the reaction tank 14. Furthermore, if the mixing tank is the saturation tank, the first component is uniformly mixed with the second component, and after the second component is caused to be saturated, the mixed gas is supplied to the reaction tank 14.

The mixed gas supplied to the reaction tank 14 is subjected to a predetermined reaction therein, and a part of the first component is consumed due to the reaction. The reaction of the first component may produce by-products which is neither the first component nor the second component. After the reaction in the reaction tank 14, the residual first and second components and the by-products are, as a residual gas, supplied to the condensing tank 15.

In the condensing tank 15, the residual gas is condensed at a predetermined temperature. This condensation is carried out using the temperature senor 16, in such a manner that the residual gas, which has a high temperature due to heat generated by the reaction in the reaction tank 14 or due to heating, is caused to have a low temperature. The condensation temperature is, as in Embodiment 1, preferably identical with the temperature of the first component being discharged from the gas storage tank 13. The condensation may be carried out at a predetermined pressure instead of the predetermined temperature. In this case, a pressure sensor is preferably adopted in place of the temperature sensor 16.

The residual gas condensed in the condensing tank 15 is discharged to the flow meter 17 with the second component being a saturated gas, and the flow meter 17 measures the flow of the discharged gas. The flow measured by the flow meter 17 is corrected using the correction value which has been worked out in advance, so that the flow of the first component is precisely worked out.

In this manner, in a system in which the concentration of a low-boiling gas in a mixed gas made up of gasses which cannot be completely separated from each other and have different boiling points varies, the flow of the low-boiling gas can be easily and precisely measured without using devices such as a dew point meter, a gas chromatography, and a mass spectrometer.

[Embodiment 3]

Embodiment 3 of the present invention will be described with reference to FIG. 4. In Embodiments 1 and 2, only one type of the mixed gas including a gas whose flow is measured is provided. However, the present invention makes it possible to measure the flow even when two types of mixed gasses each including a gas whose flow is measured are provided. For instance, even in a system in which the concentration of a gas whose flow is measured is constant as in Embodiment 1 or in a system in which the concentration of a gas whose flow is measured is varied as in Embodiment 2, suitable systems are realized as the need arises, if the mixed gasses whose flows are measured cannot be mixed with each other. The following will describe a system in which two types of mixed gasses each including a target gas whose flow is measured are provided and the gas concentrations of these target gasses vary.

Figure 4:
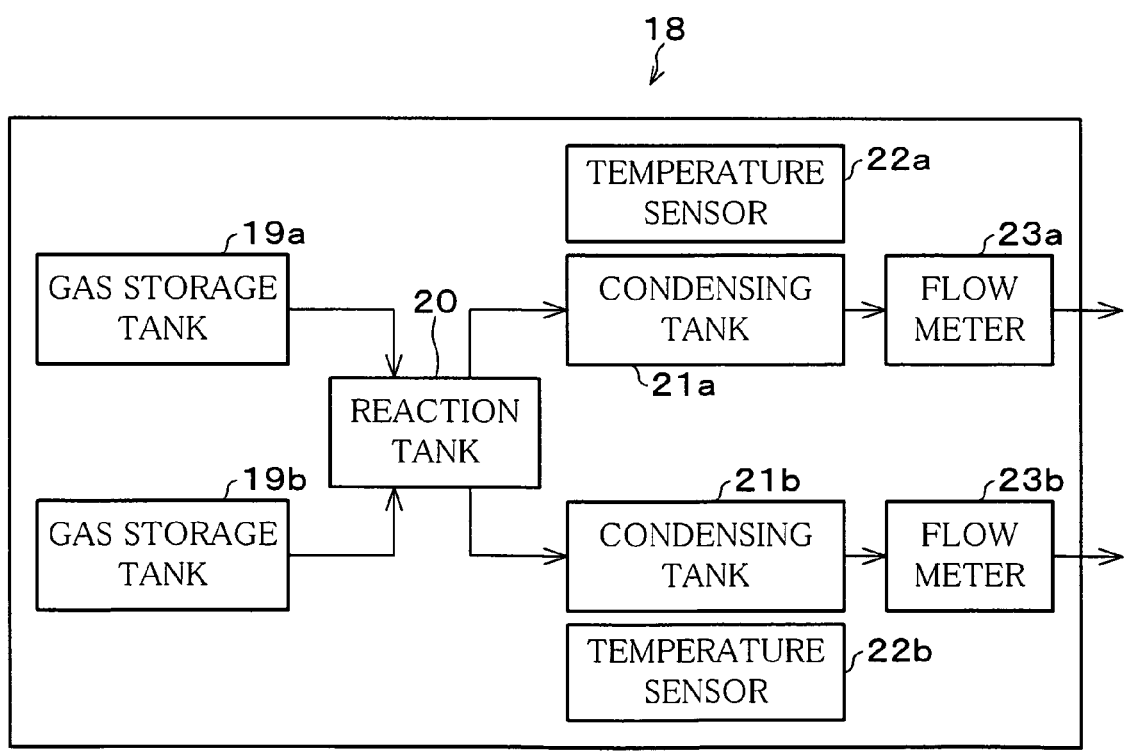
FIG. 4 relates to a further embodiment of the present invention, and is a block diagram schematically showing a gas flow measuring device.

FIG. 4 is a block diagram schematically showing a gas flow measuring device 18 of the present embodiment. Gasses whose flows are measured are a first component a and a first component b. These first components a and b may be identical gasses or may be different gasses. As in FIG. 4, the gas flow measuring device 18 includes: (a) members corresponding to the first component a, namely a gas storage tank 19*a*, a condensing tank 21*a*, a temperature sensor 22*a*, and a flow meter 23*a*; (b) members corresponding to the first component b, namely a gas storage tank 19*b*, a condensing tank 21*b*, a temperature sensor 22*b*, and a flow meter 23*b*; and (c) a member corresponding to both the first components a and b, namely a reaction tank 20. These members are identical with those in Embodiments 1 and 2 so that the descriptions thereof are omitted. The gasses (first components a and b and second components a and b) are also identical with the gasses (first component and second component) in Embodiments 1 and 2, and a correction value in the present embodiment is worked out in the same manner as those in Embodiments 1 and 2.

A method of measuring the flows of the first components a and b using the above-mentioned gas flow measuring device 18 is described. First, the first component a is discharged from the gas storage tank 19*a*. Then the first component a is mixed with a gas (hereinafter, second component a) having a boiling point higher than that of the first component a, and then the mixed gas (hereinafter, mixed gas a) is supplied to the reaction tank 20. In the meantime, the first component b is discharged from the gas storage tank 19*b*. After mixing the first component b with a gas (hereinafter, second component b) having a boiling point higher than that of the first component b, the mixed gas (hereinafter, mixed gas b) is supplied to the reaction tank 20.

Note that, the gas flow measuring device 18 may also has members such as flow control sections and mixing tanks corresponding to the respective gasses. When the flow control sections are included, the flows of the first components a and b being discharged are controlled by the respective flow control sections. When, meanwhile, the mixing tanks are provided, the mixing of the first component a with the second component a and the mixing of the first component b with the second component b are uniformly carried out, and then the mixed gasses are supplied to the reaction tank 20. When these mixing tanks are saturation tanks, mixed gas a in which the second component a is saturated and the mixed gas b in which the second component b is saturated are supplied to the reaction tank 20.

In the reaction tank 20, the mixed gas a and the mixed gas b are separated and do not mix with each other. These mixed gasses are independently subjected to reactions in the reaction tank 20.

After the reactions in the reaction tank 20, the residual of the mixed gas a, which is not used in the reaction, and by-products produced by the reaction of the mixed gas a are mixed so as to form a residual gas a, and this residual gas a is supplied to the condensing tank 21*a*. Meanwhile, the residual of the mixed gas b, which is not used in the reaction, and by-products produced by the reaction of the mixed gas b are mixed so as to form a residual gas b, and this residual gas b is supplied to the condensing tank 21*b*.

In the condensing tank 21*a*, the residual gas a is condensed at a predetermined temperature using the temperature sensor 22*a*, and then the residual gas a is discharged to the flow meter 23*a*. The predetermined temperature is preferably identical with a temperature of the first component a discharged from the gas storage tank 19*a*. In the condensing tank 21*b*, meanwhile, the residual gas b is condensed at a predetermined temperature using the temperature sensor 22*b*, and then the residual gas b is discharged to the flow meter 23*b*. The predetermined temperature is preferably identical with a temperature of the first component b discharged from the gas storage tank 19*b*.

Subsequently, the flow of the condensed residual gas a is measured by the flow meter 23*a* and then the residual gas a is discharged therefrom. The flow of the condensed residual gas b is also measured by the flow meter 23*b* and then the residual gas b is discharged therefrom. The respective flows measured by the flow meters 23*a* and 23*b* are corrected with reference to the correction values which have been calculated in advance, so that the flows of the first components a and b are precisely measured. The correction values in this case correspond to the conditions on the occasion that the first components a and b move inside the gas flow measuring device 18. When the flow meter 23*a* is arranged to be suitable for the mixed gas a and the flow meter 23*b* is arranged to be suitable for the mixed gas b, the flows measured by the respective flow meters are the precise flows of the first components a and b.

In this manner, the flows of two types of gasses can be measured. The flows of more than two types of gasses can also be measured in the same manner as above. That is to say, the correction values corresponding to the respective gasses are calculated in advance, and a gas storage tank, a condensing tank, and a flow meter are provided for each gas. With this, the respective flows of more than two types of gasses are precisely measured in the same manner as above.

The present invention may be alternatively characterized as a gas flow measuring device and gas flow measuring method arranged such that, the flows of two types of substances which are mixed with each other, have different boiling points, and are chemically proven are measured using the flow meter graduated for the low-boiling substance, with the high-boiling substance being condensed at a predetermined temperature so as to cause the flow of this substance to be known.

The gas flow measuring method of the present invention may be alternatively characterized in that, the gas flow of the low-boiling gas in the mixed gas including two types of gasses having different boiling points is measured in such a manner that the mixed gas is condensed at a predetermined temperature so that the gas flow of the high-boiling gas is caused to be known, the flow of the mixed gas is measured using the flow meter graduated to the low-boiling gas in advance, and the flow of the low-boiling gas is worked out from the relationship between the result of the measurement using the flow meter and the above-mentioned predetermined temperature.

EXAMPLE

The gas flow measuring device of the present invention will be more specifically described with reference to the following example. Note that, however, the present invention is not limited to the example. The present example is based on the premise that the gas flow measuring device includes a fuel cell as the reaction tank.

A fuel cell is an electric power generator which electrochemically oxidizes a fuel and directly converts a chemical energy of the fuel to an electric energy. The fuel cell constantly receives substances for the reaction from the outside, and is basically made up of a fuel electrode (anode), oxidizer electrode (cathode), and electrolyte. In the fuel cell, the combustion reaction (i.e. oxidative reaction) of the fuel is carried out on the anode side, while the reduction of an oxidizer is carried out on the cathode side. The present example describes a polymer electrolyte fuel cell adopting an ion-exchange membrane as the electrolyte.

In the polymer electrolyte fuel cell, high-purity hydrogen and high-purity oxygen are used as the fuel and oxidizer, and the ion-exchange membrane is adopted as the electrolyte. The polymer electrolyte fuel cell is arranged such that the hydrogen is used for the power generation on the anode side, while the oxygen is used for the power generation on the cathode side. In other words, the oxidation of the fuel is carried out on the anode side, while the reduction of the oxygen is carried out on the cathode side. As a result, a part of the hydrogen burns so that water is produced. In the present example, moreover, the high-boiling gas in which a hydrogen gas is mixed with an oxygen gas is water vapor.

Figure 5:
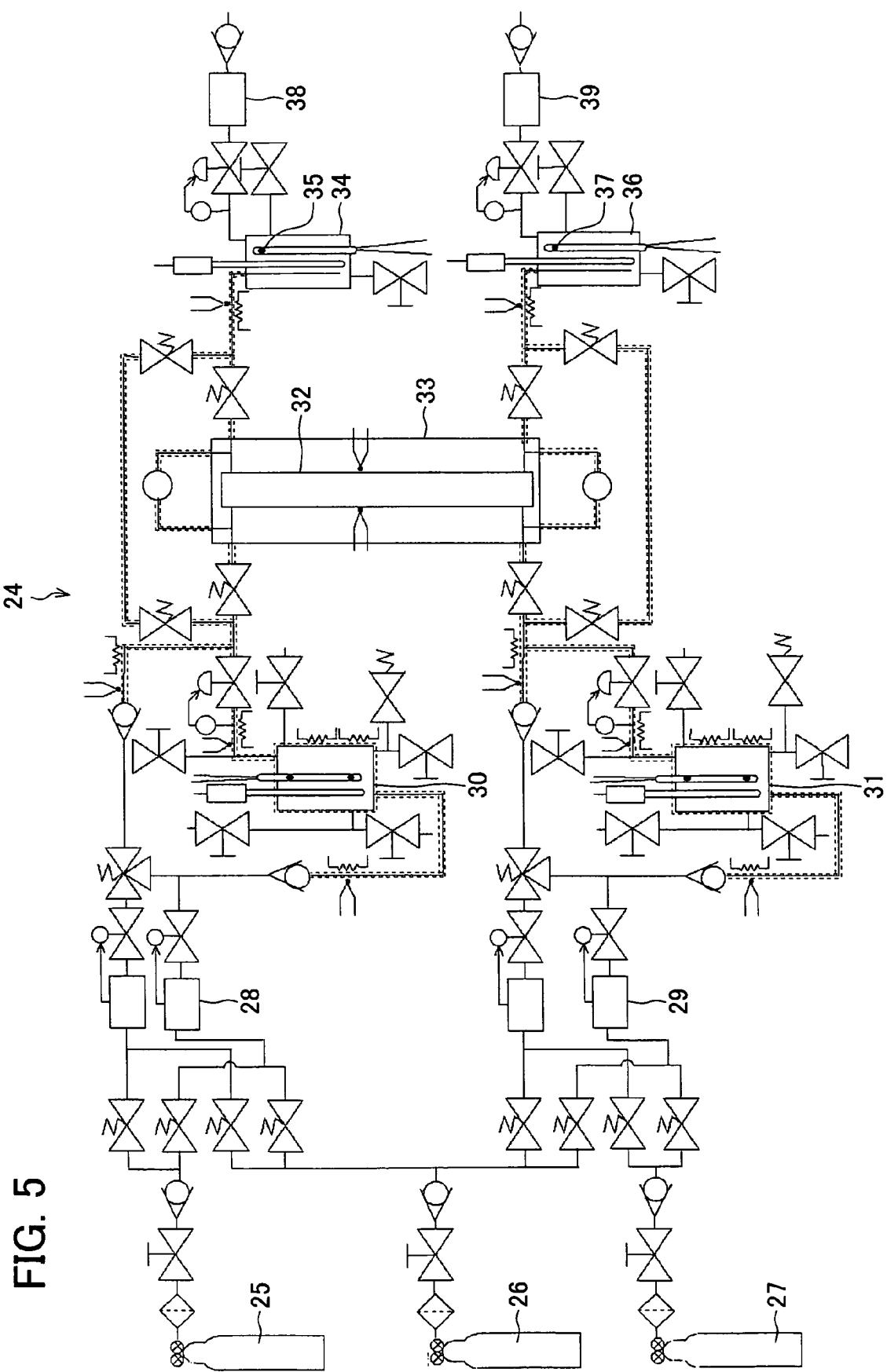
FIG. 5 is a block diagram schematically showing a gas flow measuring device of an example of the present invention.

FIG. 5 is a block diagram schematically showing a gas flow measuring device 24 of the present example. As shown in FIG. 4, the gas flow measuring device 24 of the present example includes a hydrogen cylinder 25, a nitrogen gas cylinder 26, an oxygen cylinder 27, a first flow control section 28, a second flow control section 29, a first saturation tank 30, a second saturation tank 31, a fuel cell 32, a thermostatic chamber 33, a first trap tank 34, a first temperature sensor 35, a second trap tank 36, a second temperature sensor 37, a first flow meter 38, and a second flow meter 39.

The hydrogen cylinder 25, the nitrogen gas cylinder 26, and the oxygen cylinder 27 store hydrogen gas, nitrogen gas, and oxygen gas, respectively. The hydrogen gas and oxygen gas are used for the power generation by the fuel cell 32, and the nitrogen gas is provided for substituting for the hydrogen gas and oxygen gas.

The first flow control section 28 controls the flow of the hydrogen gas, while the second flow control section 29 controls the flow of the oxygen gas. The flow of the hydrogen gas discharged from the hydrogen cylinder 25 is controlled by the first flow control section 28, and this hydrogen gas is supplied to the first saturation tank 30, with the flow of the hydrogen gas being controlled to be constant. The flow of the oxygen gas discharged from the oxygen cylinder 27 is controlled by the second flow control section 29, and this oxygen gas is supplied to the second saturation tank 31, with the flow of the oxygen gas being controlled to be constant. The hydrogen gas is discharged form the hydrogen cylinder 25 at room temperature. The oxygen gas is also discharged from the oxygen cylinder 27 at room temperature.

In the first saturation tank 30, the supplied hydrogen gas is mixed with a vapor having a boiling point higher than that of the hydrogen gas, and then the vapor is caused to be saturated. In the second saturation tank 31, the supplied oxygen is mixed with a vapor having a boiling point higher than that of the oxygen gas, and then the vapor is caused to be saturated. Subsequently, the mixed gas including the saturated vapor and the hydrogen gas is supplied to the fuel cell 32, and the mixed gas including the saturated vapor and the oxygen gas is also supplied to the fuel cell 32.

The fuel cell 32 is provided inside the thermostatic chamber 33, in order to cause the ambient temperature of the fuel cell 32 to be constant. In the fuel cell 32, the hydrogen gas on the anode side and the oxygen gas on the cathode side are used for the power generation. On the anode side, oxidation is carried out and a part of the hydrogen gas is consumed, so that water is produced. Meanwhile, on the cathode side, reduction is carried out so that a part of the oxygen gas is reduced. The reactions on the anode side and on the cathode side produce heat so that the fuel cell 32 has a high temperature. As a result, on the anode side, the hydrogen gas not used for the power generation, the vapor added in the first saturation tank 30, and vapor come of the water produced by the power generation remain. Similarly, on the cathode side, the oxygen gas not used for the power generation and the vapor added in the second saturation tank 31 remain. A part of the hydrogen gas may cross-leaks to the anode side as hydrogen atoms. Furthermore, when the fuel cell 32 is a stacked-type, the loss of the hydrogen gas may occur as the hydrogen gas diffuses from a seal area to the outside.

Then the mixed gas of the residual hydrogen gas and vapor on the anode side is supplied to the first trap tank 34, while the mixed gas of the residual oxygen gas and vapor on the cathode side is supplied to the second trap tank 36. A temperature of the first trap tank 34 is kept at room temperature using the first temperature sensor 35, and the mixed gas is condensed in the first trap tank 34. A temperature of the second trap tank 36 is kept at room temperature using the second temperature sensor 37, and the mixed gas is condensed in the second trap tank 36. In the present example, the flows of the hydrogen gas and oxygen gas are measured, and as described above, these gasses are discharged from the hydrogen cylinder 25 and the oxygen cylinder 27 without heating or cooling, i.e. discharged at room temperatures. On this account, the respective condensations in the first trap tank 34 and the second trap tank 36 are carried out at room temperature.

The mixed gasses condensed in the first trap tank 34 and the second trap tank 36, respectively, are supplied to the first flow meter 38 and the second flow meter 39, as gasses whose dew points are within the range of room temperature. The first flow meter 38 and the second flow meter 39 measure the flows of the respective gasses supplied thereto. In the present example, hot-wire flow meters are adopted as the first flow meter 38 and the second flow meter 39. The hot-wire flow meter converts the temperature change when a liquid flows to a quantity of flow. Since the present example aims for measuring the flows of the hydrogen gas and oxygen gas, the first flow meter 38 and the second flow meter 39 are graduated for the hydrogen gas and the oxygen gas, respectively. To graduate for the hydrogen gas indicates that the flow is displayed with reference to a formula corresponding to hydrogen gas, because a formula for enabling the hot-wire flow meter to convert the temperature change to the flow varies with the type of a fluid. The graduation for the oxygen gas is carried out in a similar manner.

In this manner, the flow of the mixed gas of the hydrogen gas and the vapor after passing through the fuel cell 32 and the flow of the mixed gas of the oxygen gas and the vapor are measured.

Note that, since the flows measured above are those of the mixed gasses, it is necessary to work out the precise flows of the hydrogen gas and the oxygen gas. These precise flows are worked out by correcting the flows measured above using the correction values calculated in advance. The correction values are calculated as a correction graph, by measuring the flows of the mixed gas of the hydrogen gas and vapor and the mixed gas of the oxygen gas and vapor, in a system with no fuel cell, i.e. in a system with no change of the concentrations of the hydrogen gas and the oxygen gas.

FIGS. 6 to 12 are graphs showing the correction values. The graphs in FIGS. 6 to 12 are worked out as the result of measurement of the flow of the mixed gas of the hydrogen gas and vapor or the flow of the mixed gas of the oxygen gas and vapor, in a system with no fuel cell. In all graphs, a value figured out by subtracting the flow measured by the flow meter from the flow controlled by the flow control section is shown as a flow deviation. Parameters for working out the correction values are: initial flows (flows controlled by the flow control section) of the hydrogen gas and the oxygen gas; a pressure in the system (flow path); a condensation temperature; and a type of the low-boiling gas. The high-boiling gas is vapor.

Figure 6:
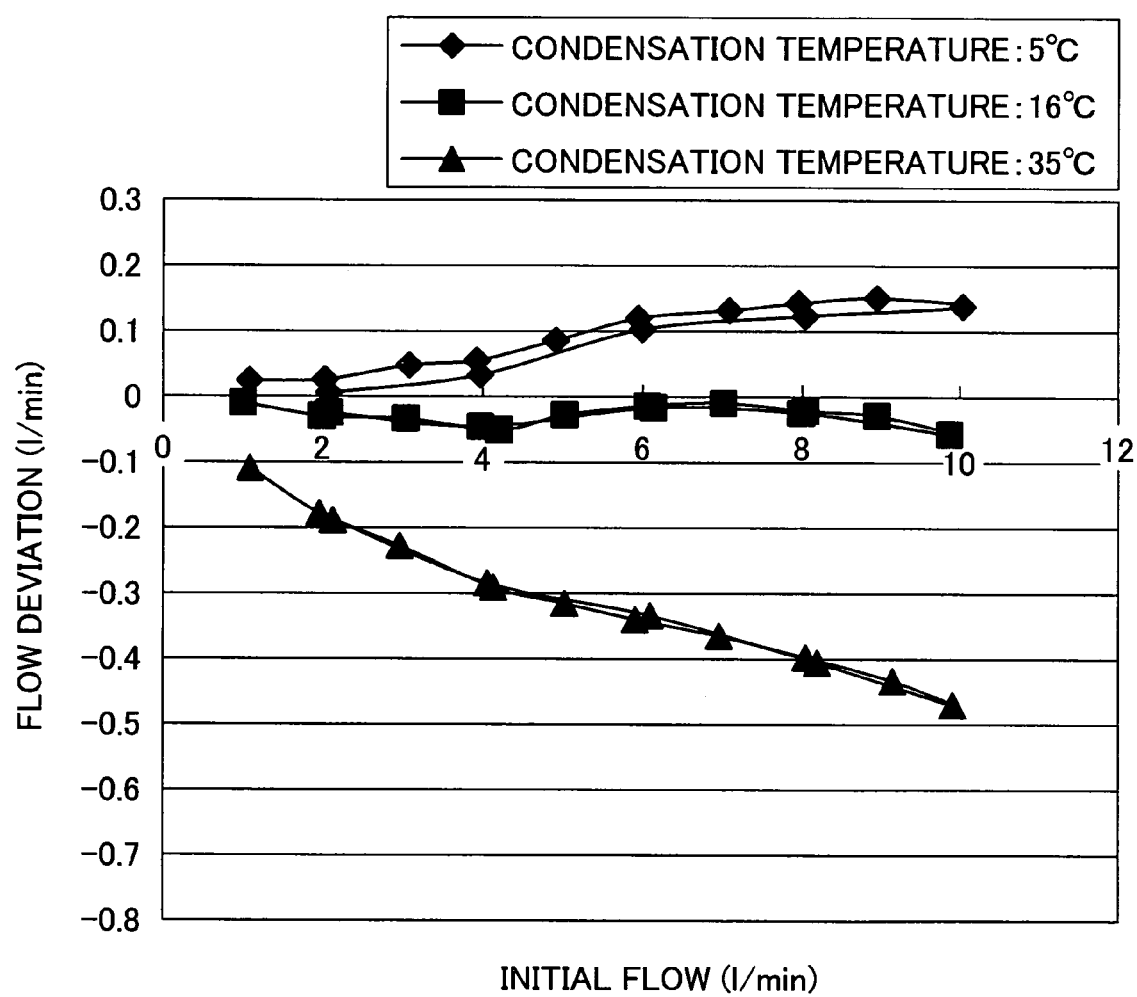
FIG. 6 is a graph showing correction values worked out in the example of the present invention.
Figure 7:
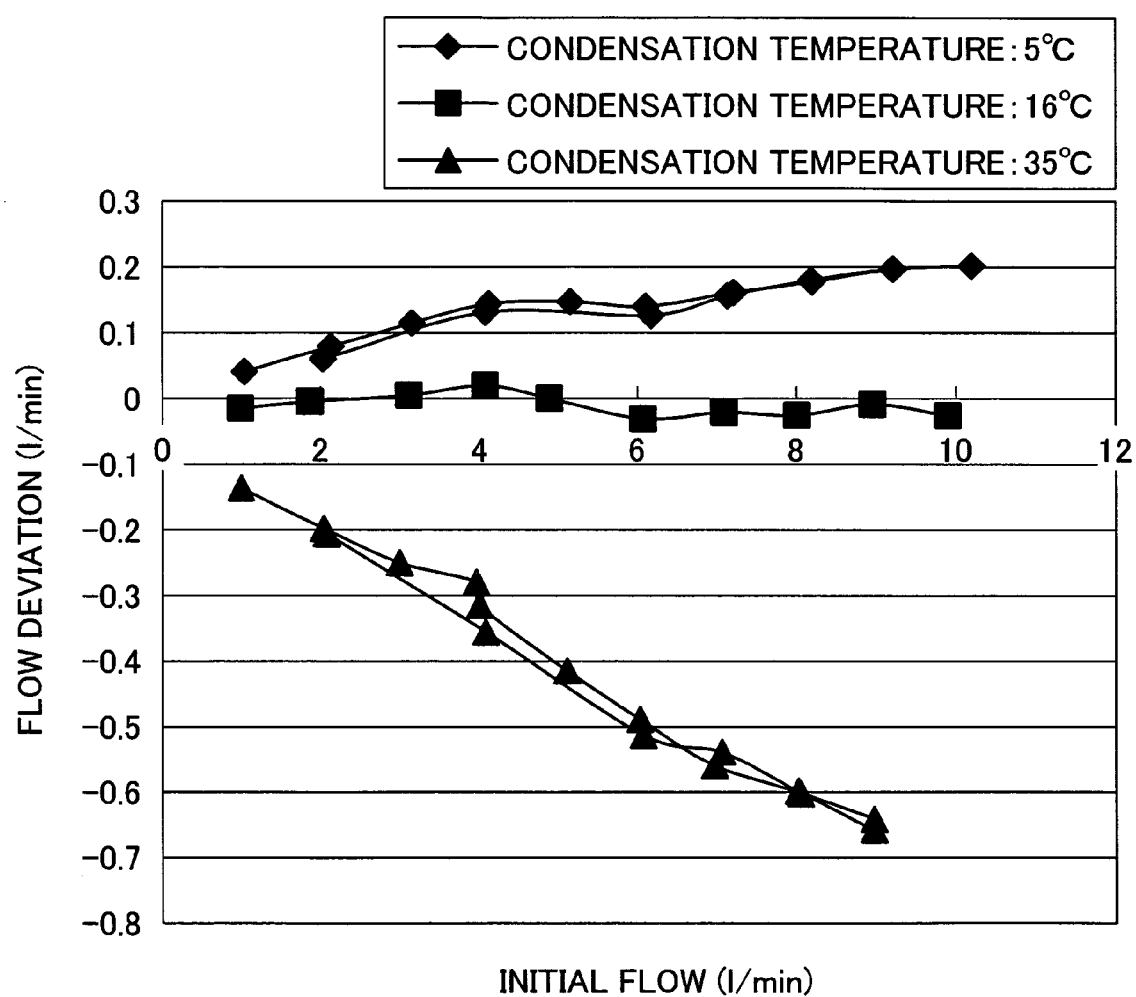
FIG. 7 is a graph showing correction values worked out in the example of the present invention.

FIGS. 6 and 7 are graphs showing flow deviations of the hydrogen gas and the oxygen gas, when the initial flows of the hydrogen gas and the oxygen gas are varied. In FIGS. 6 and 7, the condensation temperatures of the hydrogen gas and the oxygen gas are 5° C., 16° C., and 35° C. A back pressure is the atmospheric pressure.

Figure 8:
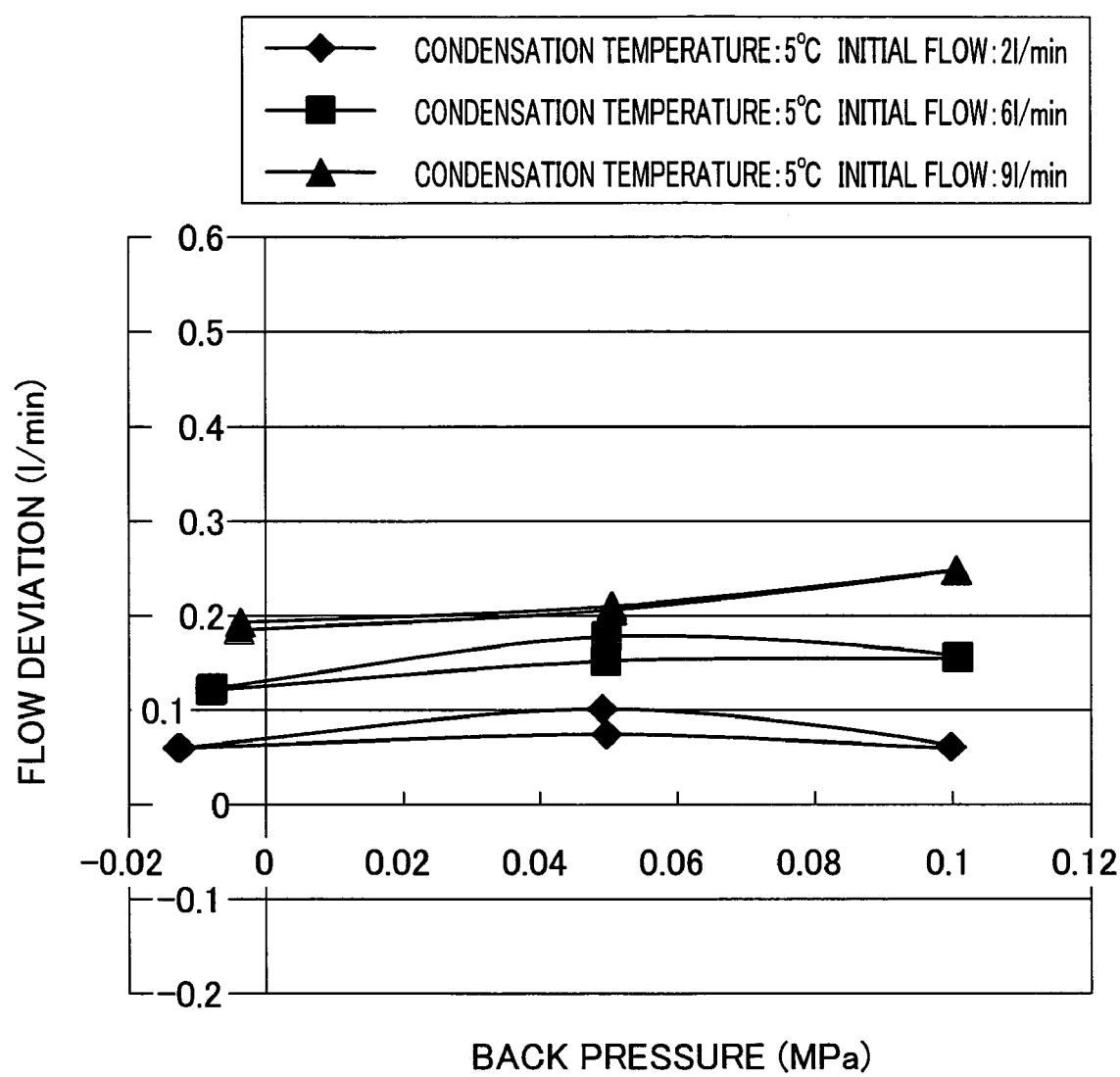
FIG. 8 is a graph showing correction values worked out in the example of the present invention.
Figure 9:
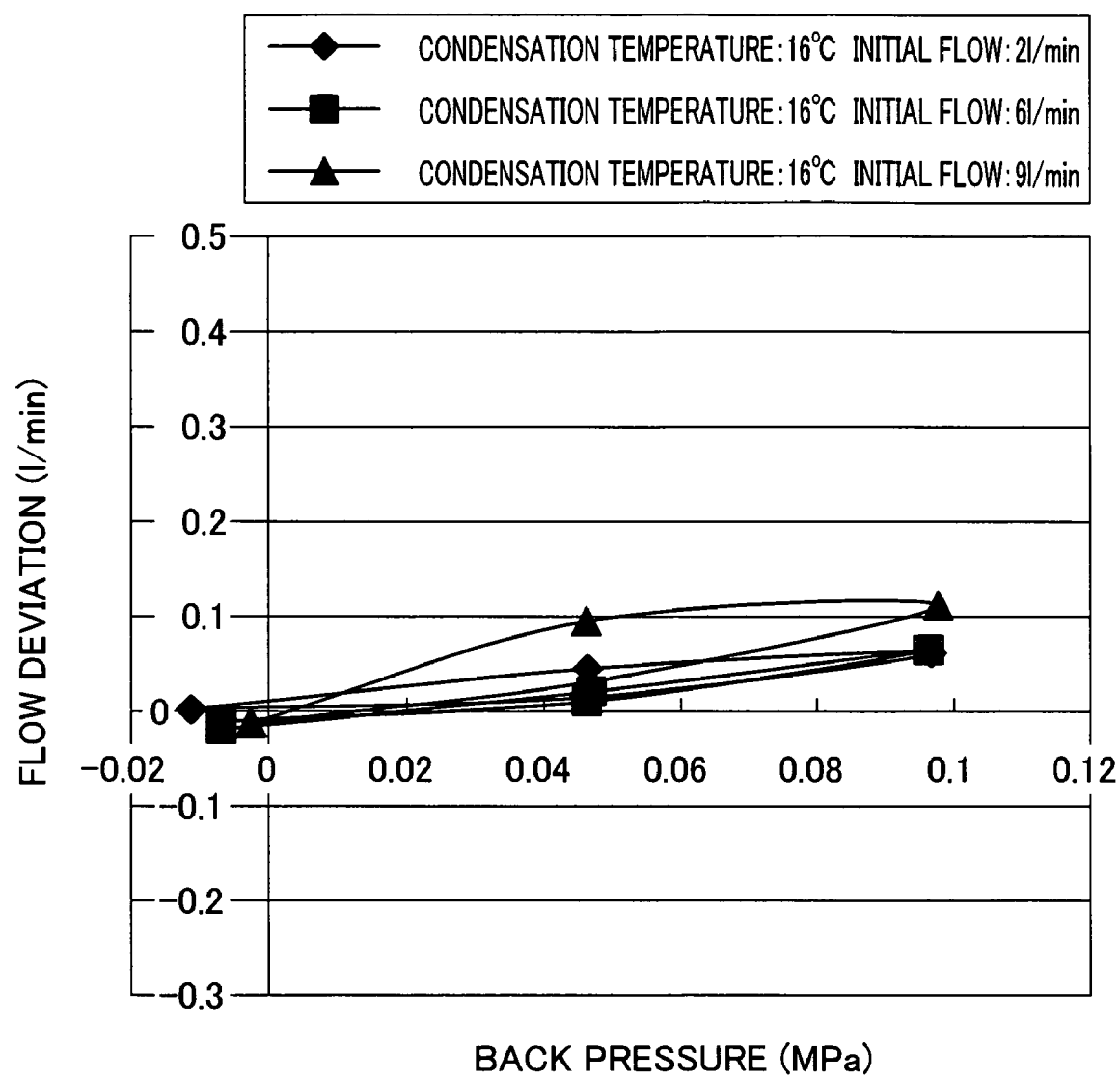
FIG. 9 is a graph showing correction values worked out in the example of the present invention.
Figure 10:
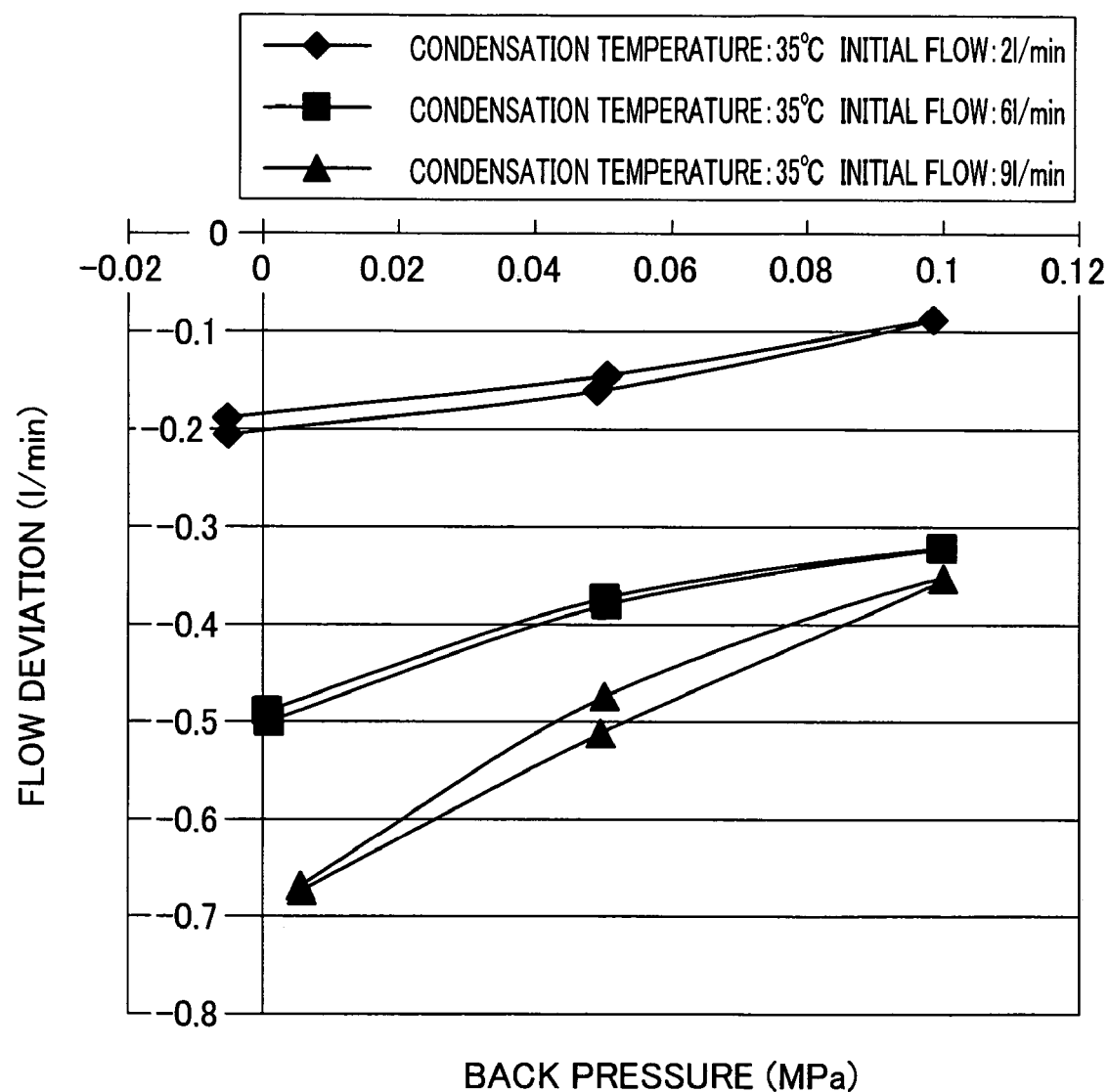
FIG. 10 is a graph showing correction values worked out in the example of the present invention.

FIGS. 8 to 10 are graphs of the flow deviations of the hydrogen gas when the back pressure is varied. The condensation temperatures are, 5° C. in FIG. 8, 16° C. in FIG. 9, and 35° C. in FIG. 10. The initial flows of the hydrogen gas in the respective figures are 2 l/min, 6 l/min, and 9 l/min.

Figure 11:
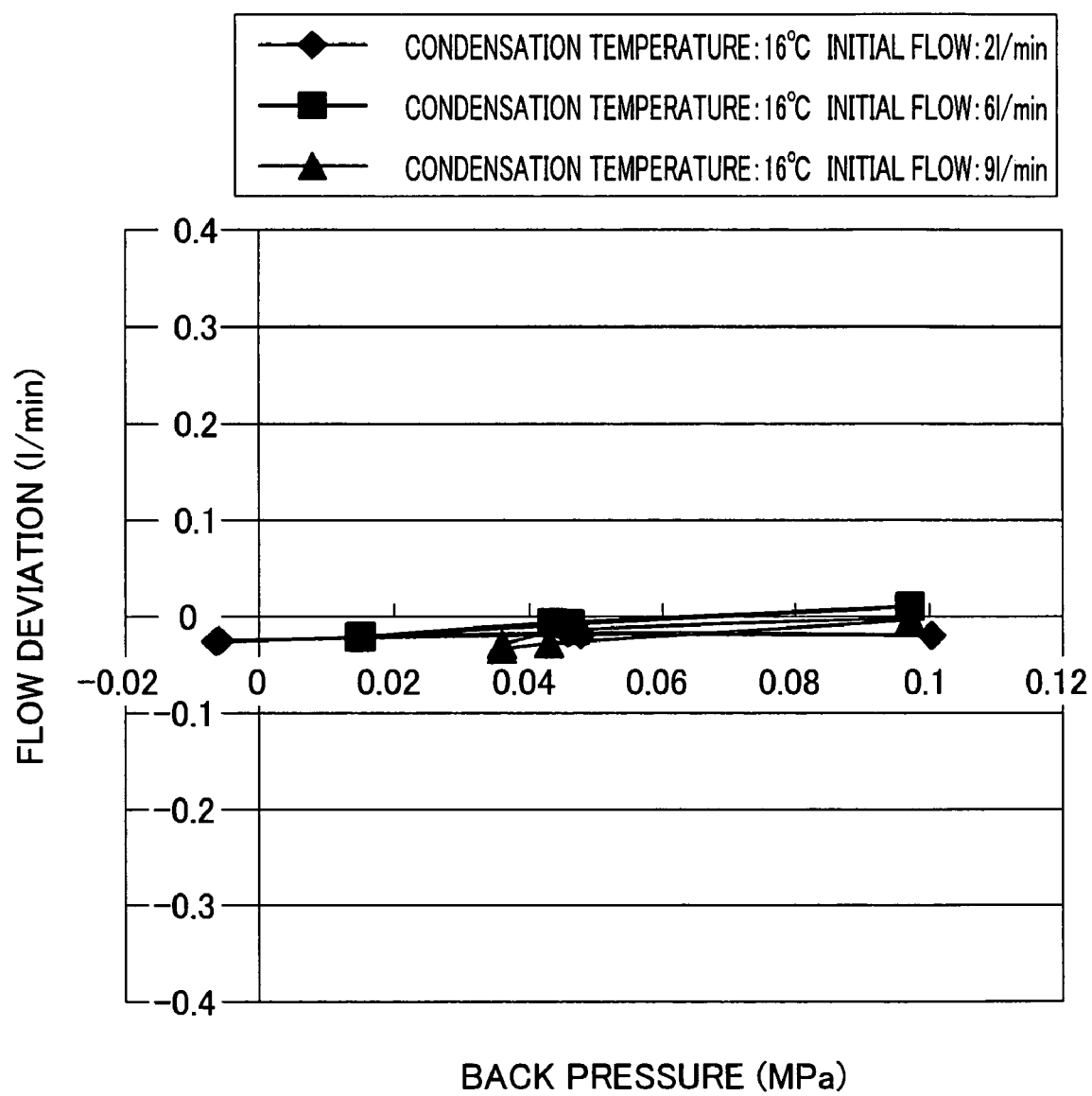
FIG. 11 is a graph showing correction values worked out in the example of the present invention.
Figure 12:
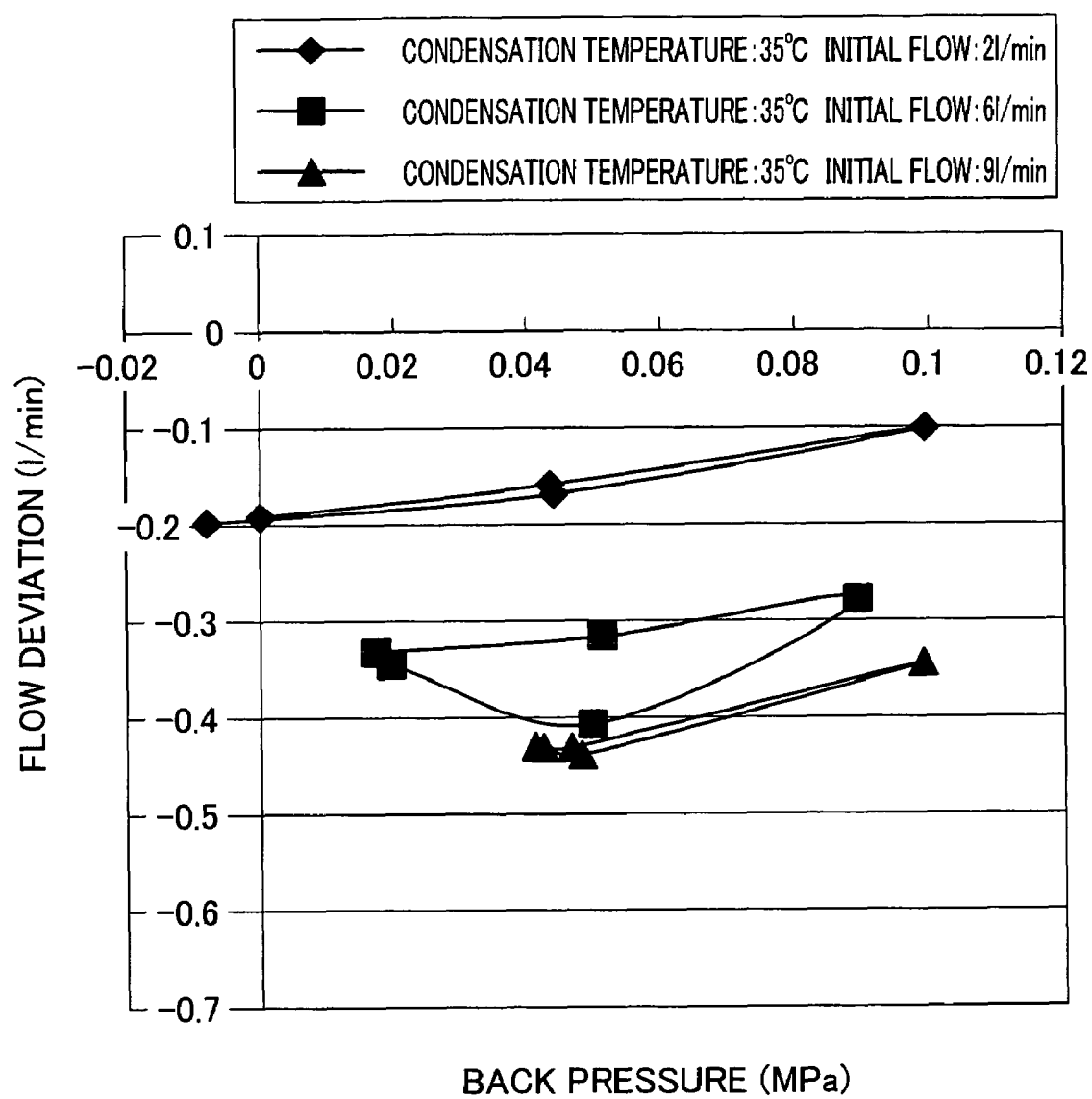
FIG. 12 is a graph showing correction values worked out in the example of the present invention.

FIGS. 11 and 12 are graphs of the flow deviations of the oxygen gas when the back pressure is varied. The condensation temperatures are 16° C. in FIG. 11 and 35° C. in FIG. 12. The initial flows of the oxygen gas in the respective figures are 2 l/min, 6 l/min, and 9 l/min.

As shown in the graphs of FIGS. 6 to 12, the graphs showing the correction values may be plotted in such a manner that the flow is measured at several points corresponding to the respective conditions, and values between the points are worked out by a conventional method such as linear interpolation and spline interpolation, or a conversion formula may be calculated from the result of the interpolation, using, for instance, a least-squares method. In this manner, the correction values for carrying out the conversion to precise values are kept as graphs. Note that, even though the present example adopts a hot-wire flow meter, the graphs are similarly worked out when a volume flow meter or a mass flow meter is adopted.

Using the correction values shown as the flow deviations in FIGS. 6 to 12, the flows of the hydrogen gas and the oxygen gas are precisely worked out. For instance, according to FIG. 6, the flow deviation when the condensation temperature is 35° C. and the initial flow of the hydrogen gas is 2 l/min is –0.2 l/min. In the case of the gas flow measuring device 24, when the flow of the hydrogen gas passing through the first flow control section is 2 l/min, the condensation temperature in the first trap tank 34 is 35° C., and the back pressure is the atmospheric pressure, the flow of the hydrogen gas is precisely measured by adding the flow deviation (–0.2 l/min) to the flow measured by the first flow meter 38.

Note that, if it has already been known that the conditions of the gas flow measuring device 24 are identical with the above-mentioned conditions, the flow meter 38 is graduated for the mixed gas including the hydrogen gas and vapor and the second flow meter 39 is graduated for the oxygen gas and vapor, with reference to the corresponding correction value (–0.2 l/min). With this, the measured flows can be regarded as the precise flow of the hydrogen gas and the flow of the oxygen gas.

As described above, even in a system in which the concentrations of the hydrogen gas and the oxygen gas are changed, the flows of the hydrogen gas and the oxygen gas are precisely measured only by measuring either the flow of the mixed gas including the hydrogen gas after the concentration change and the vapor or the mixed gas including the oxygen gas after the concentration change and the vapor. Furthermore, since it is possible to measure the flow of the hydrogen gas before entering into the fuel cell and the precise flow of the hydrogen gas discharged from the fuel cell. By calculating the difference between these flows, the precise flow of the hydrogen gas used for the power generation by a fuel cell can be measured, and this can be used for evaluating the characteristics of the fuel cell. Moreover, when the hydrogen gas leaks from the main body of the fuel cell to the outside, an amount of the leaked hydrogen gas can be figured out in such a manner that the flow of the hydrogen gas involved with the power generation is calculated from the electricity generated, and this flow of the hydrogen gas is compared with the difference between the flow of the hydrogen gas flowing into the fuel cell and the flow of the hydrogen gas discharged from the fuel cell.

Note that, apart from the fuel cell, the gas flow measuring method of the present example can be used for measuring the flow of a mixed gas including oxygen or nitrogen and vapor or the flow of a mixed gas including oxygen or nitrogen and ethanol gas. In these cases, a flow meter graduated for air is adopted.

The above-described gas flow measuring device and the gas flow measuring method of the present invention are a device and method for precisely measuring the flow of one component of a gas in which two types of components are mixed and cannot be completely separated form each other, and thus it is possible to use the device and method for various industrial sectors requiring the measurement of the flow of mixed gasses. In particular, in a system in which the concentration of a gas whose flow is to be measured is changed, the flow can be measured easily but precisely. For instance, the device and method of the present invention can be suitably adopted to a fuel cell evaluating device which measures the flow of hydrogen, oxygen, and air on a cell exit side.

In addition to the above, it is preferable that the gas flow measuring device of the present invention further includes a temperature sensor for sensing a temperature at which the mixed gas is condensed in the condensing tank.

With this temperature sensor for sensing a temperature at which the mixed gas is condensed in the condensing tank, a temperature at which the mixed gas is condensed in the condensing tank is kept at a predetermined temperature, and hence the condensation in the condensing tank can be carried out at a desired temperature. The measuring accuracy of the gas flow measuring device only depends on the accuracies of the flow meter and the temperature sensor, and the flow meter and the temperature sensor are generally highly accurate. Furthermore, the gas flow measuring device is not required to have a control accuracy, since actuators such as a Peltier device and piezo device are not adopted. For this reason, the gas flow measuring device is highly accurate as a system on the whole. Also, the gas flow measuring device is only made up of the flow meter, the condensing tank, and the temperature sensor so as to have a simple structure. Thus the gas flow measuring device is cheaper than devices adopting a dew point meter.

In addition to the above, it is preferable that the gas flow measuring device of the present. invention further includes a mixing tank for mixing said two types of gasses.

Since the gas flow measuring device further includes the mixing tank for mixing said two types of gasses, two types of gasses having different boiling points are uniformly mixed with each other in the mixing tank.

In addition to the above, it is preferable that the gas flow measuring device of the present invention further includes a flow control section for controlling a flow of a low-boiling gas of said two types of gasses.

Since the gas flow measuring device further includes the flow control section for controlling a flow of a low-boiling gas of said two types of gasses, the gas flow of the low-boiling gas before being mixed is caused to be a desired value. For instance, when the gas flow measuring device is a system in which the concentration of the low-boiling gas is changed, the flow measured by the flow meter is compared with the flow controlled by the flow control section, so that an amount of the change of the concentration can be figured out.

In addition to the above, it is preferable that the gas flow measuring method of the present invention further includes the step of: (iv) correcting the flow measured in the step (iii), using a correction value, the correction value being calculated in advance in such a manner that, a flow of a low-boiling gas of said two types of gasses is measured, said two types of gasses are mixed so that the mixed gas is produced, and then a flow of the mixed gas is measured.

Since the step (iv) is further included in the gas flow measuring method, the gas flow of the low-boiling gas of the mixed gas can be precisely measured.

That is to say, since the flow of the mixed gas measured by the flow meter may include an error due to the presence of the high-boiling gas, the correction value for correcting this error is calculated in advance, and thus the flow is precisely measured by correcting the flow using the correction value. Note that, the error due to the presence of the high-boiling gas is measured in such a manner that, after measuring the flow of the low-boiling gas, two types of gasses are mixed with each other and then the flow of the mixed gas is measured. The correction value is worked out from this error. With this, it is possible to precisely measure the flow of the low-boiling gas without being influenced by the high-boiling gas.

In addition to the above, it is preferable that the gas flow measuring method of the present invention is arranged so that, in the step (ii), a high-boiling gas of said two types of gasses is caused to be saturated.

Since, in the above-mentioned gas flow measuring method, the high-boiling gas of said two types of gasses is caused to be saturated in the step (ii), the gas flow of the high-boiling gas is caused to be known.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A gas flow measuring device, comprising:
   a flow meter for measuring a flow of a mixed gas including two types of gasses which are mixed with each other after condensing the mixed gas and have different boiling points; and
   a condensing tank for condensing the mixed gas.

2. The gas flow measuring device as defined in claim 1, further comprising a flow control section for controlling a flow of a low-boiling gas of said two types of gasses.

3. The gas flow measuring device as defined in claim 1, further comprising a temperature sensor for sensing a temperature at which the mixed gas is condensed in the condensing tank.

4. The gas flow measuring device as defined in claim 3, further comprising a flow control section for controlling a flow of a low-boiling gas of said two types of gasses.

5. The gas flow measuring device as defined in claim 1, further comprising a mixing tank for mixing said two types of gasses.

6. The gas flow measuring device as defined in claim 5, further comprising a flow control section for controlling a flow of a low-boiling gas of said two types of gasses.

7. The gas flow measuring device as defined in claim 1, wherein, the condensing tank condenses the mixed gas in such a manner as to cause a high-boiling gas of said two types of gasses to be saturated.

8. The gas flow measuring device as defined in claim 1, further comprising a reaction tank for changing a concentration of a low-boiling gas of said two types of gasses.

9. The gas flow measuring device as defined in claim 8, wherein, the reaction tank is any one of a fuel cell, a oil refinery device, or a distilling device.

10. A gas flow measuring method comprising the steps of:
    (i) mixing two types of gasses having different boiling points and thus producing a mixed gas;
    (ii) condensing the mixed gas; and
    (iii) measuring a flow of the mixed gas after condensing.

11. The gas flow measuring method as defined in claim 10, further comprising the step of:
    (iv) correcting the flow measured in the step (iii), using a correction value,
    the correction value being calculated in advance in such a manner that, a flow of a low-boiling gas of said two types of gasses is measured, said two types of gasses are mixed so that the mixed gas is produced, and then a flow of the mixed gas is measured.

12. The gas flow measuring method as defined in claim 10, wherein, in the step (ii), a high-boiling gas of said two types of gasses is caused to be saturated.

13. The gas flow measuring method as defined in claim 10, wherein, the mixed gas is condensed by either heating or pressurizing the mixed gas.

14. The gas flow measuring device as defined in claim 1, further comprising a flow control section for controlling a flow of a low-boiling gas of said two types of gasses; wherein a correction value, used for correcting the flow of the low-boiling gas of said two types of gasses, is calculated in advance in such a manner that, the flow of the low-boiling gas of said two types of gasses is measured, said two types of gasses are mixed so that the mixed gas is produced, and then the flow of the mixed gas is measured.

* * * * *